United States Patent
Fratianni et al.

(10) Patent No.: US 9,625,300 B2
(45) Date of Patent: Apr. 18, 2017

(54) METERING MATERIAL DISPENSER

(71) Applicant: Sonoco Development, Inc., Hartsville, SC (US)

(72) Inventors: Edmond L. Fratianni, Old Chatham, NY (US); Keith E. Antal, Nebo, NC (US); Chad E. Lagace, Cohoes, NY (US)

(73) Assignee: Sonoco Development, Inc., Hartsville, SC (US)

( * ) Notice: Subject to any disclaimer, the term of this patent is extended or adjusted under 35 U.S.C. 154(b) by 17 days.

(21) Appl. No.: 14/747,013

(22) Filed: Jun. 23, 2015

(65) Prior Publication Data

US 2015/0369645 A1    Dec. 24, 2015

Related U.S. Application Data

(60) Provisional application No. 62/015,764, filed on Jun. 23, 2014.

(51) Int. Cl.
*G01F 11/34* (2006.01)
*B65D 47/12* (2006.01)
*B65D 51/16* (2006.01)
*B65D 53/06* (2006.01)
*G01F 11/26* (2006.01)

(52) U.S. Cl.
CPC ............. *G01F 11/34* (2013.01); *B65D 47/12* (2013.01); *B65D 47/126* (2013.01); *B65D 51/1622* (2013.01); *B65D 53/06* (2013.01); *G01F 11/261* (2013.01)

(58) Field of Classification Search
CPC ... G01F 11/34; B65D 47/126; B65D 51/1622; B65D 53/06; B65D 47/12
USPC .................................................. 222/454–456
See application file for complete search history.

(56) References Cited

U.S. PATENT DOCUMENTS

| | | | |
|---|---|---|---|
| 1,066,384 A | 7/1913 | Desmarais |
| 1,155,323 A | 9/1915 | McBroom |
| 1,208,189 A | 12/1916 | Miller |
| 1,328,184 A | 1/1920 | Moore |
| 1,355,210 A | 10/1920 | Buckley |
| 1,498,491 A | 6/1924 | Stinson et al. |
| 1,568,923 A | 1/1926 | Ruiz |
| 1,605,702 A | 11/1926 | Brierley |
| 1,727,227 A | 9/1929 | Brierley |
| 1,859,109 A | 5/1932 | Oswell |

(Continued)

*Primary Examiner* — Donnell Long
(74) *Attorney, Agent, or Firm* — Flaster/Greenberg P.C.

(57) ABSTRACT

A measuring and dispensing device is defined for a stored flowable material. The device includes a container portion and a lid or covering portion. A first spout portion is formed as part of the container and is positioned on the outside of a sidewall, adjacent an upper rim. The first spout portion defines a measurement chamber. The lid closely fits on the upper rim of the container. A second spout portion is integrally formed with the lid and projects from the lid sidewall, adjacent an engagement rim. The second spout portion defines a pre-measurement chamber within the container sidewall. The first and second spout portions aligned upon assembly of the container and the lid, with the first spout portion positioned within the measurement chamber. The first spout portion is spaced from the second spout portion, with the spacing defining a discharge passageway for the measurement chamber.

16 Claims, 12 Drawing Sheets

(56) References Cited

U.S. PATENT DOCUMENTS

| | | |
|---|---|---|
| 1,969,780 A | 8/1934 | Croft |
| 2,022,031 A | 11/1935 | Fisher |
| 2,023,537 A | 12/1938 | Myers |
| 2,243,452 A | 5/1941 | Bickel el al. |
| 2,288,550 A | 6/1942 | Ramsden et al. |
| 2,318,312 A | 5/1943 | Spilo |
| 2,560,776 A | 7/1951 | Peters |
| 2,601,941 A | 7/1952 | Phillips |
| 2,668,641 A | 2/1954 | Martischang |
| 2,692,708 A | 10/1954 | Frey |
| 2,739,741 A | 3/1956 | Barnett |
| 2,778,544 A | 1/1957 | King |
| 2,782,965 A | 2/1957 | Campbell |
| 2,801,777 A | 8/1957 | Williams |
| 2,868,415 A | 1/1959 | Loew et al. |
| 2,987,222 A | 6/1961 | Vries et al. |
| 3,009,609 A | 11/1961 | Nielsen |
| 3,036,746 A | 5/1962 | Hagen |
| 3,055,561 A * | 9/1962 | Luckett .................. A47G 19/34 222/455 |
| 3,122,288 A | 2/1964 | Lee et al. |
| 3,258,177 A | 6/1966 | Ellis |
| 3,327,910 A | 6/1967 | Gould |
| 3,353,725 A | 11/1967 | Caceres |
| 3,381,859 A | 5/1968 | Yao et al. |
| 3,587,944 A | 10/1968 | Pehr |
| 3,428,226 A | 2/1969 | Lanahan |
| 3,687,341 A | 8/1972 | Stanley et al. |
| D233,973 S | 12/1974 | Jensen |
| D235,182 S | 5/1975 | Capron |
| D242,517 S | 11/1976 | Capron |
| 4,144,989 A | 3/1979 | Joy |
| D254,239 S | 2/1980 | Morin |
| 4,488,667 A | 12/1984 | Swett et al. |
| 4,804,113 A | 2/1989 | Ciaccio |
| 1,941,226 A | 12/1993 | Reiner |
| 5,467,903 A | 11/1995 | Sorensen et al. |
| 5,601,213 A | 2/1997 | Daniello |
| 5,839,619 A | 11/1998 | Willer |
| 5,890,627 A | 4/1999 | Storey |
| 5,894,965 A | 4/1999 | Robbins, III et al. |
| 5,947,329 A | 9/1999 | Bailey |
| 6,102,247 A | 8/2000 | Crawford |
| 6,269,983 B1 | 8/2001 | Jones et al. |
| 6,286,731 B1 | 9/2001 | Lillelund et al. |
| 6,786,447 B2 | 9/2004 | Geib et al. |
| 6,948,641 B1 | 9/2005 | Williams |
| 7,143,909 B2 | 12/2006 | Peterson et al. |
| 7,819,347 B2 | 10/2010 | Antal, Sr. |
| 8,251,256 B2 | 8/2012 | Antal, Sr. |
| 8,366,027 B2 | 2/2013 | Antal et al. |
| 2002/0084292 A1 | 7/2002 | Chen |
| 2005/0258189 A1 | 11/2005 | Peterson et al. |
| 2006/0144872 A1 | 7/2006 | Israel et al. |
| 2007/0181614 A1 | 8/2007 | Rvachov et al. |

\* cited by examiner

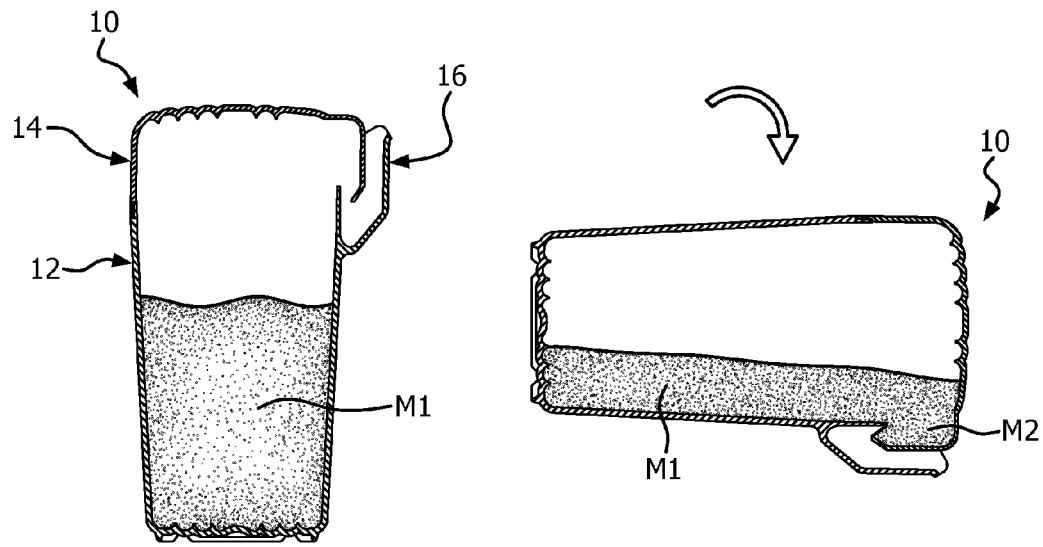
FIG. 13A
FIG. 13B
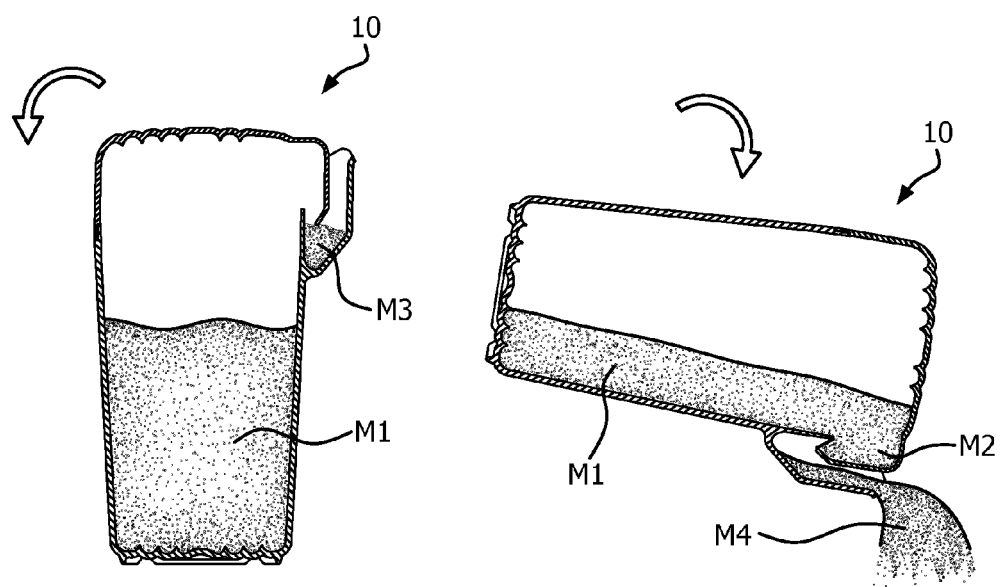
FIG. 13C
FIG. 13D

METERING MATERIAL DISPENSER

CROSS REFERENCE TO RELATED APPLICATION

The present claims priority to and the benefit of the filing date of U.S. Provisional Application Ser. No. 62/015,764, filed Jun. 23, 2014.

FIELD OF THE INVENTION

The present disclosure relates to a dispenser for granular or other flowable material and in particular a dispenser for metering the discharge of the flowable material.

BACKGROUND OF THE INVENTION

A number of forms of dispensers for granular and other flowable material are known, many with structures for metering the discharge of the material. Within the know dispensers there are forms that initiate the material discharge by rotational motion being imparted to the dispenser.

Barnett U.S. Pat. No. 2,739,741 shows a measuring and dispensing device for ground coffee wherein the discharge passageway is formed as part of a cap fixed to the top end of a container.

Luckett et al. U.S. Pat. No. 3,055,561 shows a dispenser for sugar or the like having a measuring cup attached to the outer wall of the dispenser body.

Jones et al. U.S. Pat. No. 6,269,983 shows a dispenser for salt or the like having a central reservoir and a surrounding passageway. Rotation of the dispenser deposits a salt charge into an internal cup and a reverse rotation of the dispenser directs the salt charge through the passageway to the discharge outlet.

SUMMARY OF THE INVENTION

In one aspect of the present disclosure, a measuring and dispensing device is defined for metering a portion of a stored granular or other flowable material. The device includes a container portion and a lid or covering portion. The container includes a body formed by a container sidewall and a bottom wall. The sidewall and bottom wall define a reservoir for storage of flowable material. An upper opening is formed by the container and an upper rim surrounds the opening. A first spout portion is, preferably, integrally formed as part of the container and is positioned on the outside of the sidewall, adjacent the upper rim. The first spout portion defines a measurement chamber. The lid includes a body formed by at least one lid sidewall and includes a top wall at the upper end of the sidewall. A bottom opening defines an engagement rim that surrounds the bottom opening and is adapted to closely fit with the upper rim of the container, with the lid and container forming a unitary structure upon assembly. A second spout portion is, preferably, integrally formed on the lid and projects from the lid sidewall, adjacent the lid engagement rim. The second spout portion defines a pre-measurement chamber within the container sidewall. The first and second spout portions aligned upon assembly of the container and the lid with the first spout portion positioned within the measurement chamber. The second spout portion includes a spout wall having a first wall portion and a finger portion. The finger portion extending at an inward angle and is spaced from the at least one container sidewall. The spacing between the finger portion and the container sidewall defining a measurement opening for transfer of material from the pre-chamber to the measurement chamber. The first spout portion is spaced from the second spout portion, with the spacing defining a discharge passageway for the measurement chamber.

In a further aspect of the measuring and dispensing device, the distal edge of the finger portion is curved. The curvature of the distal edge of the finger may further be concave facing the upper rim of the container. Alternatively, the distal edge of the finger portion may be straight or have other functions forms.

In a further aspect of the measuring and dispensing device a cover member may be provided for pivotal movement and for moveably covering the discharge passageway. The cover pivot may be located on the lid and the pivot may be positioned adjacent the second spout portion.

Other features of the present invention and combinations of features will become apparent from the detailed description to follow, taken in conjunction with the accompanying drawings.

BRIEF DESCRIPTION OF THE DRAWINGS

For the purpose of illustrating the invention, the drawings show one or more forms that are presently preferred. It should be understood that the invention is not limited to the precise arrangements and instrumentalities shown in the drawings.

FIGS. 13A-D are cross section views of the dispenser showing the sequential steps for dispensing a metered dose of a flowable material.

DETAILED DESCRIPTION

Figure 1:
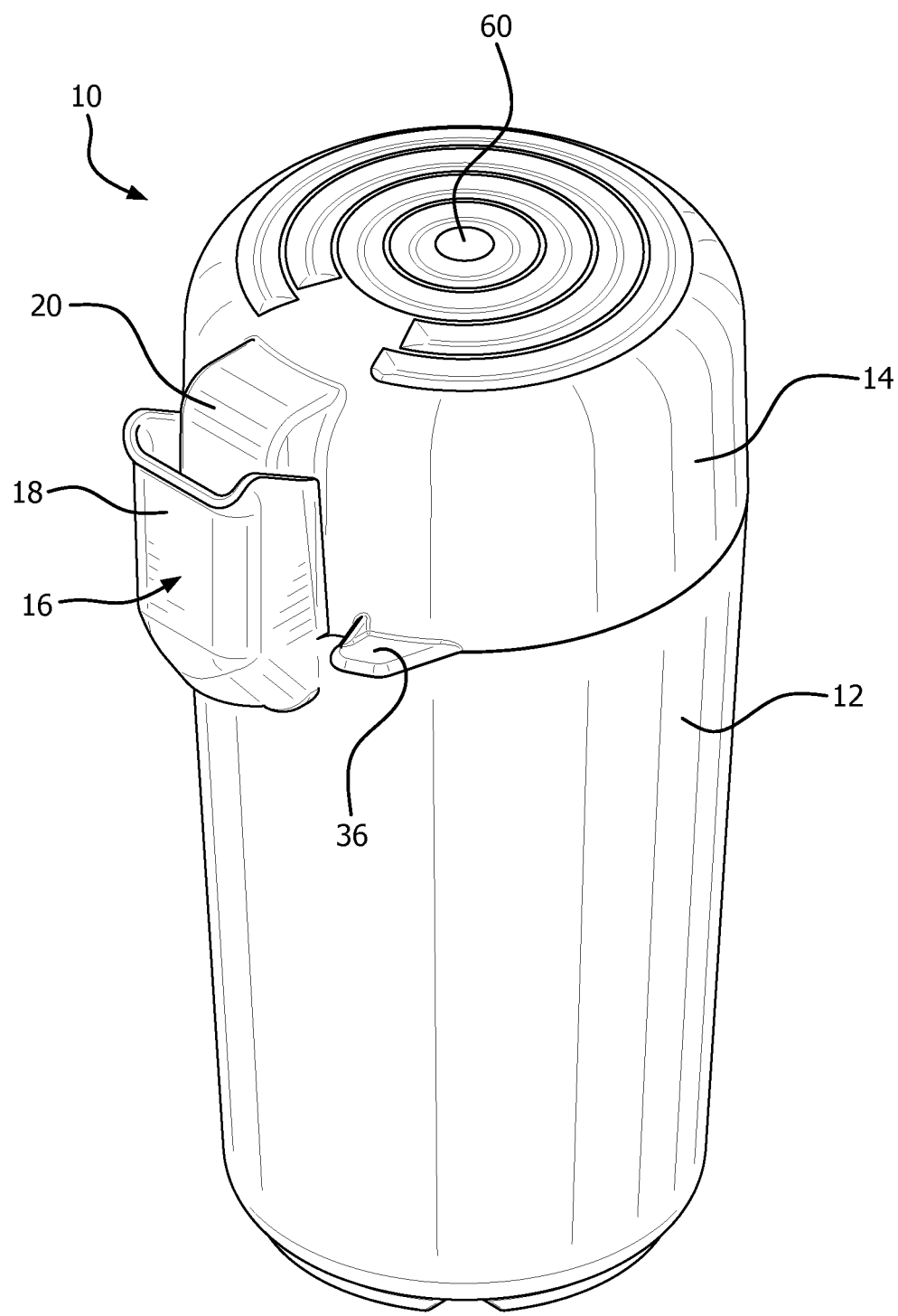
FIG. 1 is an isometric view of a dispenser in a form contemplated by the present disclosure.
Figure 2:
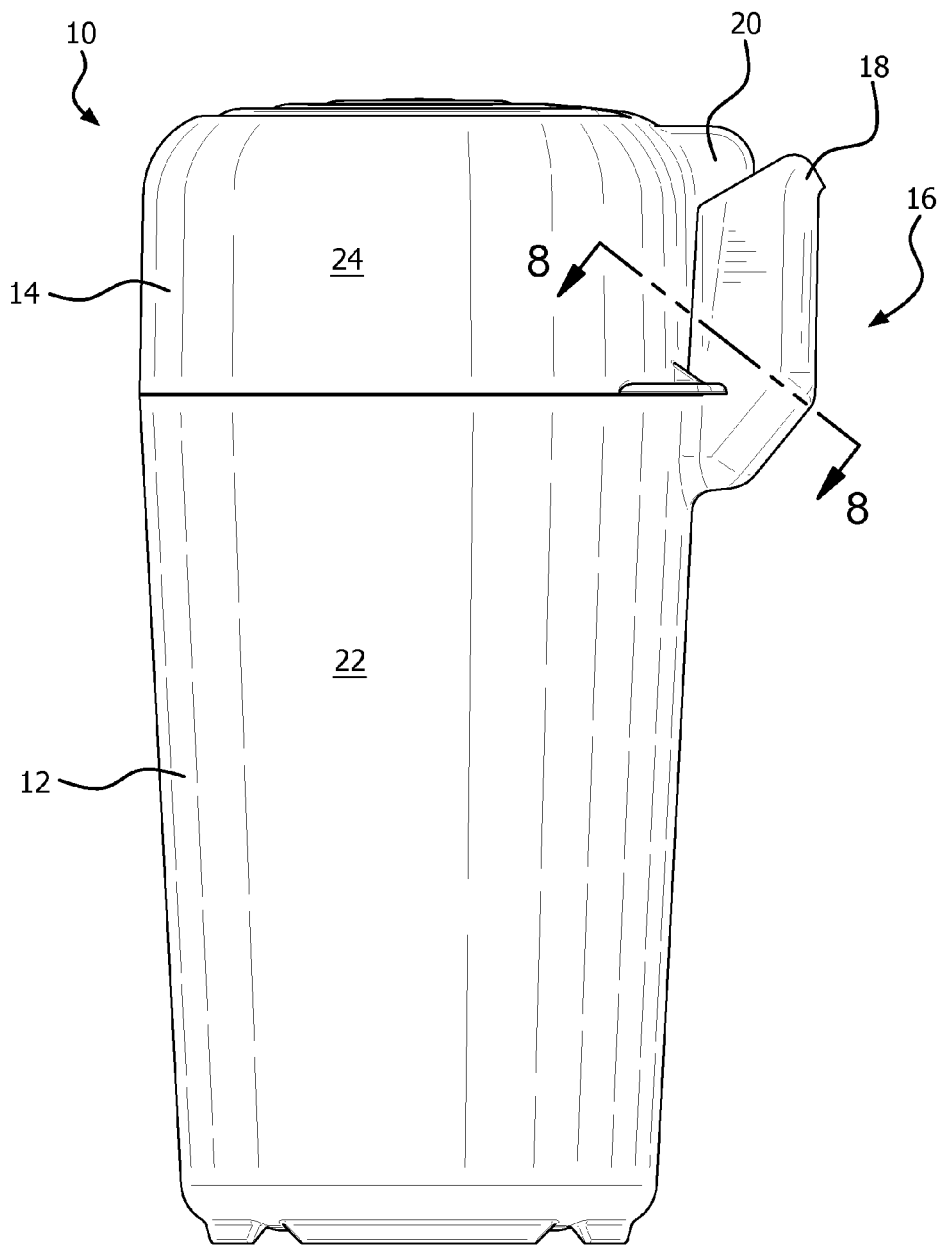
FIG. 2 is a side elevation view of the dispenser of FIG. 1.

In the figures, where like numerals identify like elements, there is shown embodiments of a dispenser. In FIG. 1, the dispenser is generally designated by the numeral 10. The dispenser 10 generally comprises a bottom portion or container 12 and a top portion or lid 14. The container 12 and lid 14 are shown in the assembled condition. Projecting outwardly from the sidewalls of the container 12 and lid 14 is a metering spout 16. The spout 16 includes a first portion 18 that is, preferably, integrally formed as part of the container 12 and a second portion 20 that is, preferably, integrally formed as part of the lid 14. The projection of the first spout portion 18 from the sidewall 22 of the container 12 is shown in FIG. 2. The second spout portion 20 projects from the sidewall 24 of the lid 14.

Figure 3:
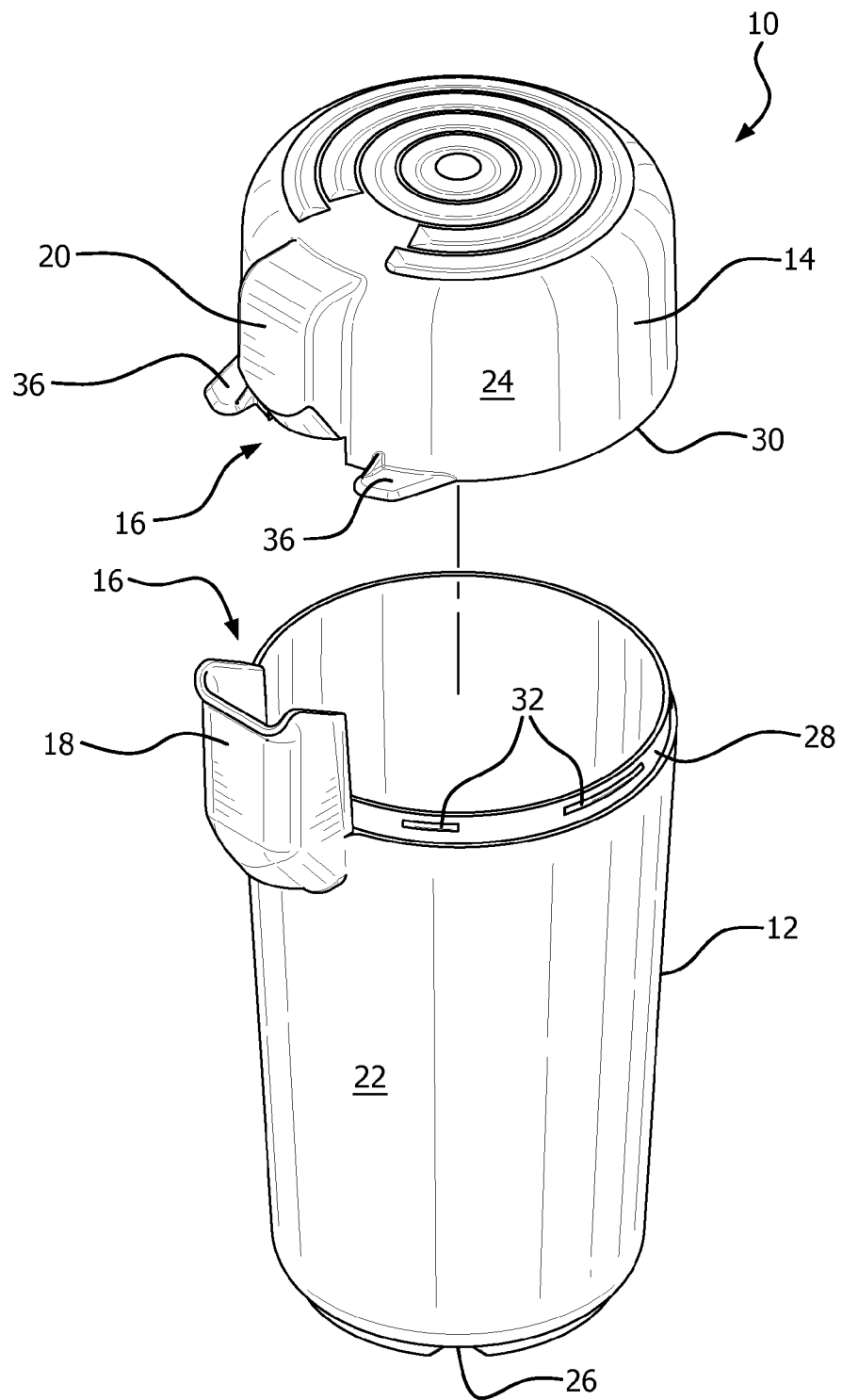
FIG. 3 is an exploded isometric view of the dispenser of FIG. 1, with the constituent parts thereof separated from one another.
Figure 4:
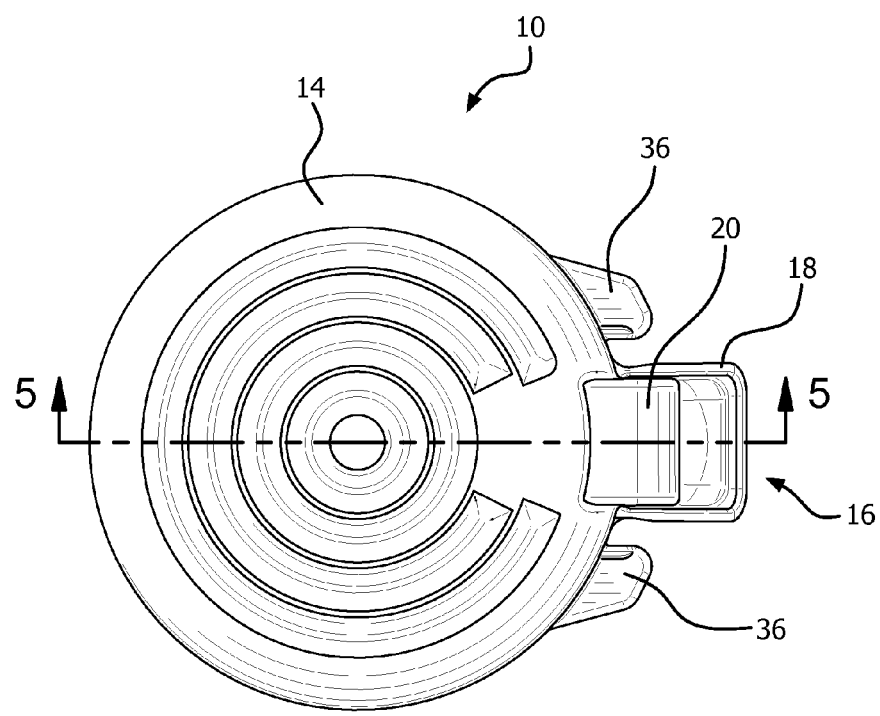
FIG. 4 is a top plan view of the dispenser of FIG. 1.
Figure 7:
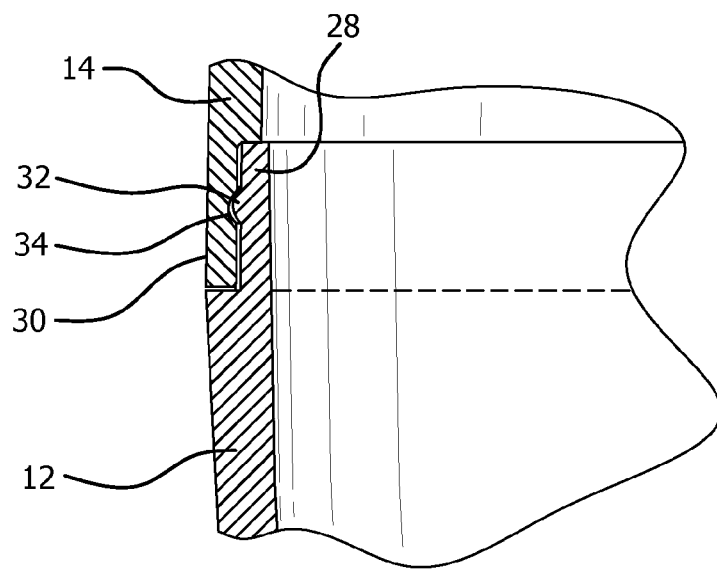
FIG. 7 is an enlarged partial view of the relevant portions of the dispenser identified in FIG. 5.

The assembly of the dispenser 10 is detailed by FIGS. 3 and 4. The container 12 defines an internal volume or reservoir for a quantity of granular or other flowable material. The reservoir is defined by the sidewall 22 and a bottom wall 26 (see FIG. 5). In the embodiment shown, the container 12 has a generally cylindrical form, with a single cylindrical sidewall 22. Other shapes for the container are possible, including those having more than one sidewall. The upper end of the container 12 defines an opening, with the sidewall 22 forming a container rim 28. As shown, the lid 14 includes an open bottom end, with the lid sidewall 24 defining a lid rim 30. The two rims 28, 30 dimensionally conform and are adapted to engage one another for fixing the lid 14 to the container 12. An engagement structure may be provided to secure the lid 14 to the rim 28 of the container 12. As friction fit is dimensionally defined. As shown in FIGS. 3 and 7, a plurality of engagement tabs 32 are formed on the outer surface of the container rim 28 and a corresponding set of slots 34 is formed on the inner surface of the lid rim 30. A reversal in location of these structures is possible and other forms of engagement may be utilized. The spout 16 projects from the sidewalls 22, 24 of the dispenser 10. The second spout portion 20 on the lid 14 is aligned with and fits within the first spout portion 18 formed as part of the container 12. Two assembly gripping tabs 36 are formed on the outside surface of the lid rim 30 and are shown on opposite sides of the spout 16. The gripping tabs 36 are used for removal of the lid 14 from the rim 28 of the container 12. The tabs 36 assist in overcoming the frictional engagement of the rim portions of the lid 14 and container 12.

Figure 5:
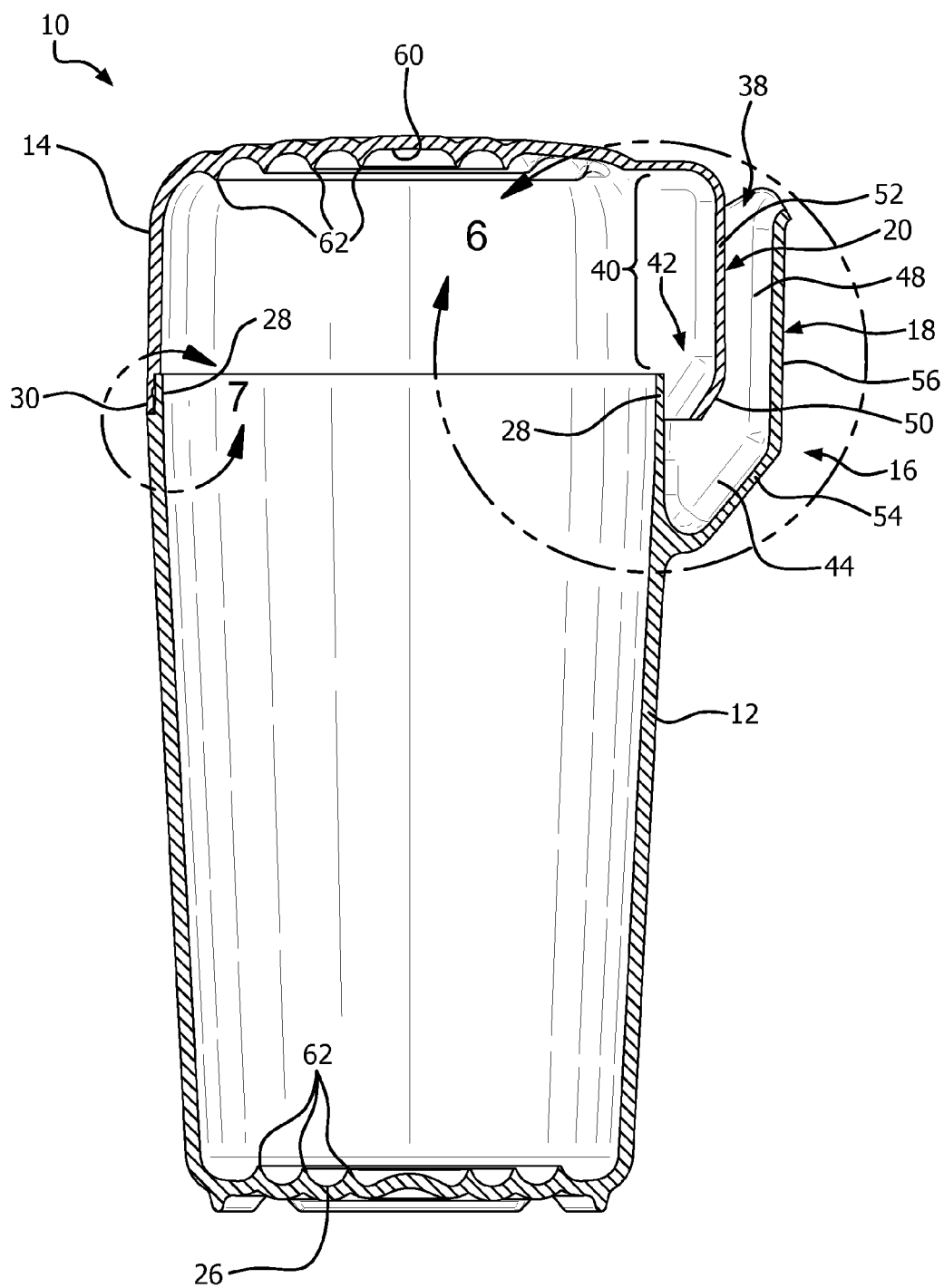
FIG. 5 is a cross section view of the dispenser as taken along line 5-5 in FIG. 4.
Figure 6:
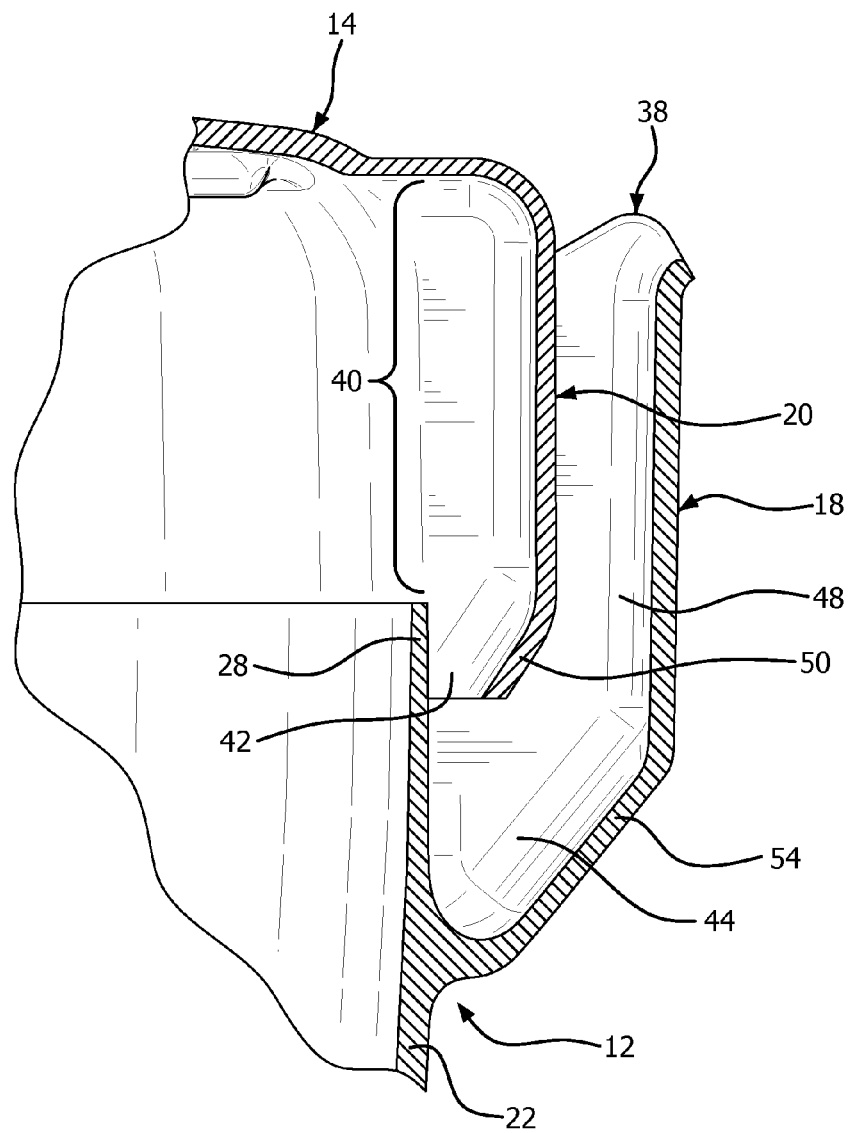
FIG. 6 is an enlarged partial view of the relevant portions of the dispenser identified in FIG. 5.

As shown in the cross sections of FIGS. 5 and 6, the alignment of the spout portions 18, 20 during assembly creates a discharge flow path from the internal reservoir to a discharge outlet 38. The flow path starts at an initial or pre-measurement chamber 40 formed within the sidewall 24 of the lid 14 and created by the second spout portion 20. This initial chamber 40 is located relatively above the container rim 28. An opening 42 is provided between the container rim 28 and the inside surface of the second spout portion 20. The opening 42 forms a passage between the initial chamber 40 and a secondary or measurement chamber 44. The measurement chamber is formed by the outside surface of the container sidewall 22 and the second spout portion 20. A discharge passage 48 is defined between the first spout portion 18 and the second spout portion 20. The discharge passage 46 communicates with the discharge outlet 38 of the spout 16.

Figure 8A:
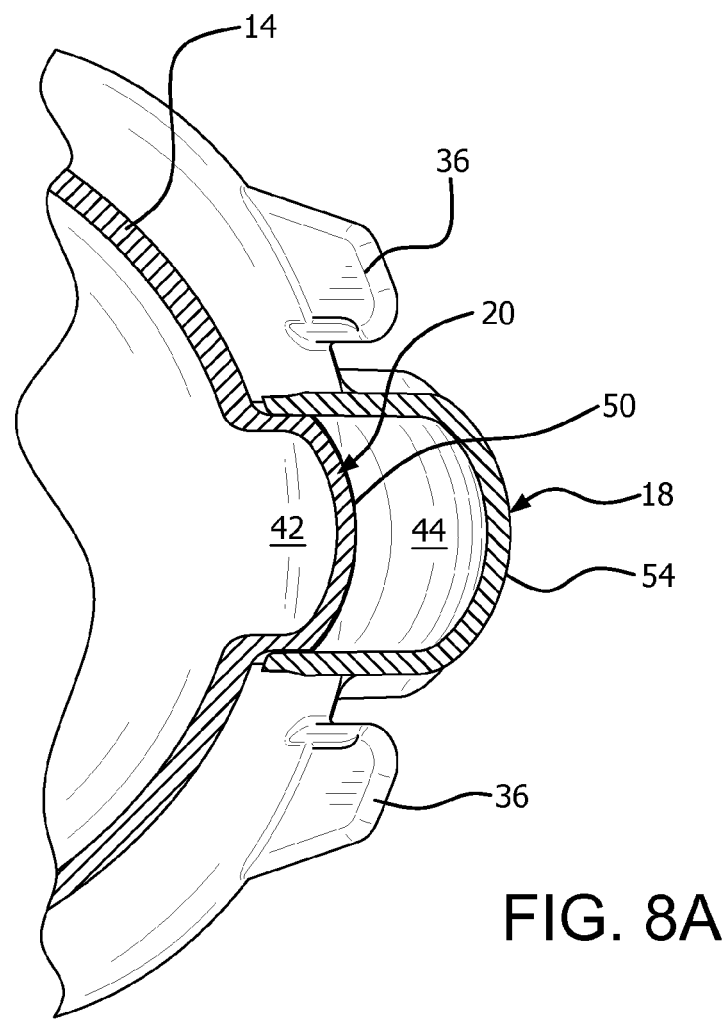
FIG. 8A is a cross section view of a portion of the dispenser taken along line 8-8 in FIG. 2.
Figure 8B:
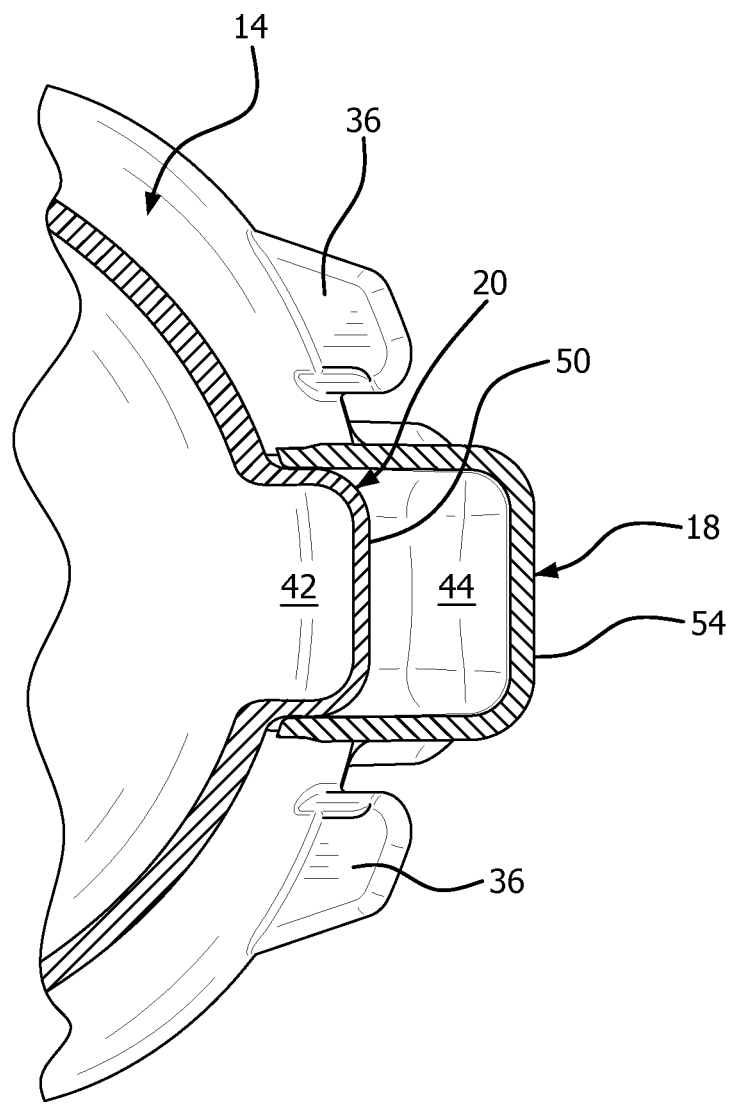
FIG. 8B is an alternate cross section view of the portion of the dispenser taken along line 8-8 in FIG. 2.
Figure 9:
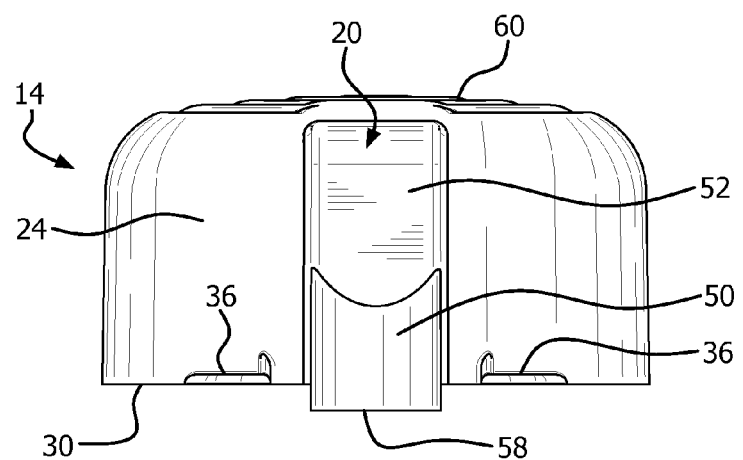
FIG. 9 is a front side elevation view of a top portion of the dispenser of FIG. 1.

As shown by the cross section, the outer wall of the second spout portion includes an inclined wall or finger 50 that angles inwardly from an outer wall 52. As shown in the further cross section of FIG. 8A, the inclined wall may have a curvature. This concave curvature of the wall 50 is also shown as being concentric with an adjacent angled wall 54 within the first spout portion 18, which forms a lower portion of the measurement chamber 44. Alternatively, as shown in FIG. 8B, the angled finger 50 on the second spout portion 20 may be substantially flat or straight, with a similarly formed angled wall 54 in the first spout portion 18. The outer wall 52 of the second spout portion 20 is substantially parallel to the outer wall portion 56 of the first spout portion 18. The two outer walls 52, 56 form the discharge passage 48. The positioning of the second spout portion 20 on the lid 14 is further shown in FIGS. 9 and 10. The second spout portion 20 is shown as projected from the outside wall 24 of the lid 14. The finger 50 extends below the lid rim 30. The bottom edge 58 of the finger 50 is positioned outwardly of the sidewall 24 to form the measurement opening 42.

Figure 10:
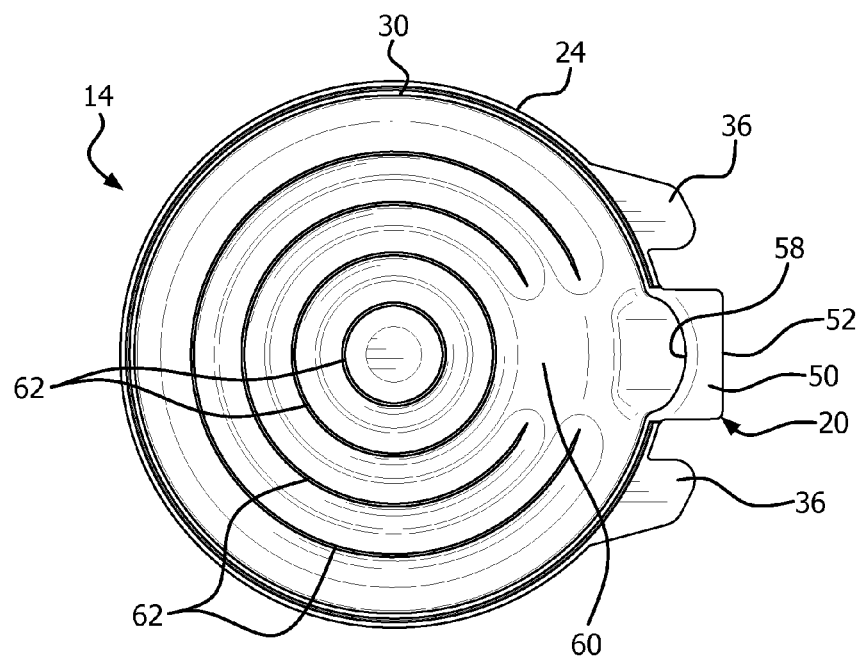
FIG. 10 is a bottom plan view of the top portion of the dispenser as shown in FIG. 9.

In the cross section of FIG. 5 and in the bottom view of FIG. 10, the inside surface of the top wall 60 of the lid 14 is shown as having an undulating surface formation. A plurality of projected edges or ribs 62 are provided within the undulating surface. A similar undulating surface configuration is provided on the bottom wall 26 of the container 12. These surfaces and the associated projections are provided to assist in the breakup of clumps formed within the granular or flowable material. For example, due to humidity or other ambient moisture, granulated sugar has a tendency to form clumps. The adhesive nature of the clumping material is often broken by impact with an adjacent surface. The projected edges 62 will impact the clumps during use of the dispenser, as discussed in more detail below. As shown, the projected edges are formed by concentric circular lines. In the top wall 60 of the lid 14, the outer lines do not form complete circles, due to the adjacent second spout portion 20. Alternate forms of the breakup edges are possible. In addition, other clump breaking structures may be added within the reservoir or to the lid as desired.

Figure 11:
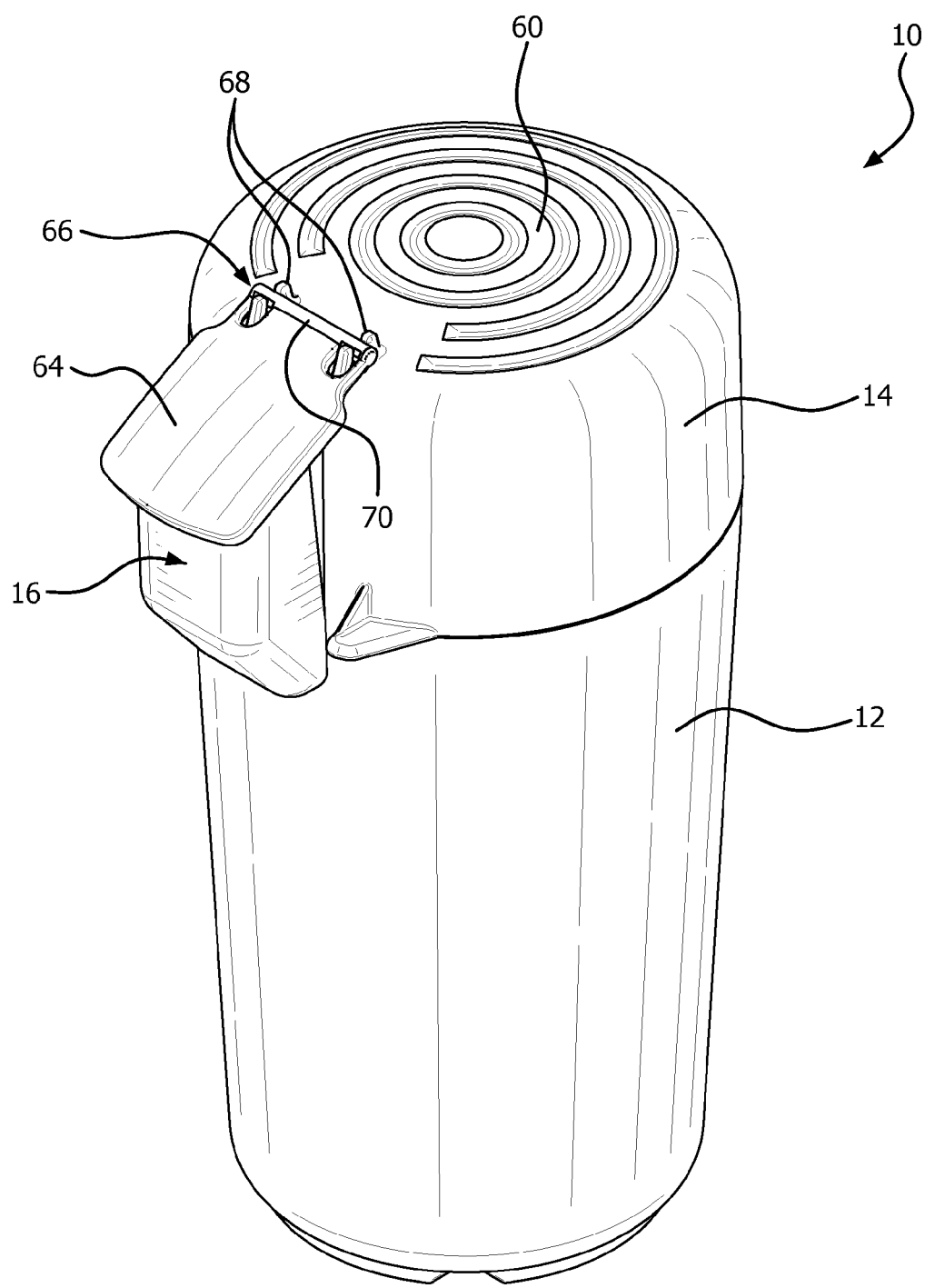
FIG. 11 is an isometric view of an alternate embodiment of a dispenser in a form contemplated by the present disclosure.
Figure 12:
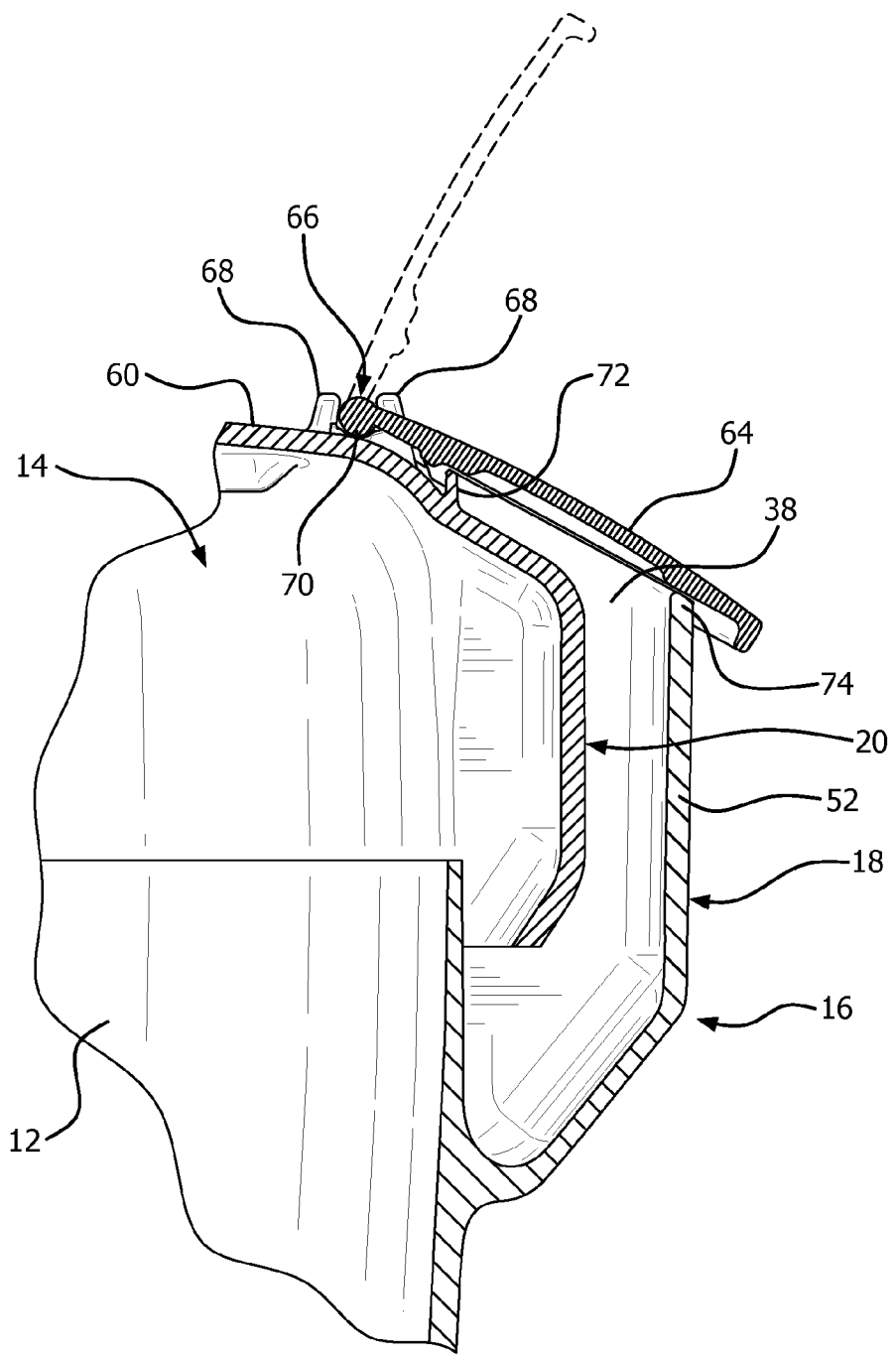
FIG. 12 is a partial cross section view of the embodiment of the dispenser of FIG. 11.

In FIGS. 11 and 12 there is shown the addition of a closure flap 64 for covering the discharge outlet 38. The flap 64 is pivotally connected 66 to the top 60 of the lid 14 adjacent the second spout portion 20. As shown, the pivot connection 66 includes a series of closely spaced projections 68 that form a slot. The flap 64 includes a pivot bar 68 at one end. The pivot bar 70 snap fits within the slot formed by projections 68 and may be rotated between a closed position, covering the discharge outlet 38, and an open position (shown in dotted lines in FIG. 12). A diverter rib 72 is provided adjacent the discharge outlet 38. The rib 72 may be formed on the top wall 60 of the lid 14 adjacent the outlet opening 38 and, as shown, forms a projected rim that surrounds the opening. The flap 64 is concave, having a well formed on the underside surface. The well rim on the flap 64 surrounds the rib 72. The projected edge of the flap 64 is shown as overhanging the lip 74 on the top edge of the outer wall 52 of the first spout portion 18. The flap 64 serves to seal the discharge outlet 38 and prevents debris from entering the measurement chamber 44. The rib 72 assists in this outlet closing function. Other forms of closures and attachment methods are possible.

The dispensing operation of the device is shown in the sequence of FIGS. 13A-D. Reference is also made to the cross sectional views of FIGS. 5 and 6. As shown in FIG. 13A, the dispenser 10 is designed to retain a quantity of a flowable material M1 within the reservoir formed by the container portion 12. Rotation of the dispenser 10 as shown in FIG. 13B causes the material M1 to flow into the lid 14 and fill the pre-measurement chamber 40 formed by the second spout portion 20. The quantity of material M2 deposited into chamber 40 is defined by the depth, height and width of the second spout portion 20. It is assumed that a relatively full tilt of the dispenser 10 will occur (at least 90 degrees from vertical), such that the reservoir material M1 is brought into the chamber 40. Within the measurement opening 42, the deposit of flowable material M2 will form an angle of repose, which may vary depending on the type of flowable material. The overlap of the finger 50 with the rim 28 of the sidewall 22 of the container 12 serves to discourage or prevent the flow of material into the measurement chamber portion of the spout 16.

Once the material M2 is deposited in the initial chamber 40 by the initial rotation shown in FIG. 13B, the dispenser 10 is returned to the normal upright position as shown in FIG. 13C. The bulk material M1 returns to the container reservoir. The measured charge of material M2 also passes through the measurement opening 42 into the secondary, measurement chamber 44. The adjacent portion of the container rim 28 serves to divide the material M1 away from the charge M2. Further, the restriction to flow created by the finger 50 serves to direct the material M2 into the secondary chamber 44. The maximum quantity of material M3 deposited into the chamber 44 is dependant on the defined volume of the chamber 44 and the angel of repose for the material M3. The relative volume of the initial chamber 40 and the secondary chamber 44, plus the flow restriction formed by the angled finger 50, serves to present a consistent quantity of material M3, per rotation of the dispenser, into the measurement chamber 44, preventing over filling the chamber 44. Hence, the structural elements of the chambers and the spacing between the walls may be varied to set a measured charge of material M3 for discharge.

Once the measured quantity of material M3 is positioned in the secondary chamber 44 of the spout 16, the dispenser 10 is again rotated as shown in FIG. 13D. This further rotation, causes the material M3 to move through the passage 48 and out of the discharge outlet 38, the discharging material is labeled M4 in the drawing. At the same time a new charge of material M2 is deposited into the pre-measurement chamber 40, with the cycle repeating for measuring a quantity of material to be dispensed.

An advantage obtained by the disclosed structure is the ability to measure or meter a consistent quantity of material, even if there is partial rotation of the dispenser (less than 180 degree turn). It is noted that the de-clumping surface projections 68, if provided, are more effective with relatively full rotation, in order to bring the reservoir material M1 into contact with the top wall 60 of the lid 14. The metering effect has also been found to be relatively consistent even when the spout is off center (that is, not at the vertical bottom of the rotated dispenser as is shown in FIGS. 13B and 13D). Variation in the form and the position of overlap of the bottom or distal edge 58 of the finger may also affect the consistency of the metered charge M3 deposited into the measurement chamber 44.

The present invention has been described and illustrated with respect to one or more exemplary embodiments. It should be understood by those skilled in the art from the foregoing that various other changes, omissions and additions may be made therein, without departing from the spirit and scope of the present invention, with the scope of the invention being described by the foregoing claims.

What is claimed is:

1. A measuring and dispensing device, comprising
a container, the container having a body portion formed by at least one container sidewall and a bottom wall at the base of the at least one container sidewall, the at least one container sidewall and the bottom wall defining a reservoir within the body portion, an opening formed at an upper end of the body portion, with an upper rim of the at least one container sidewall surrounding the opening,
a first spout portion integrally formed with the container and positioned on the outside of the at least one container sidewall adjacent the upper rim, the first spout portion forming a measurement chamber adjacent the at least one sidewall and the container rim,
a lid having a lid body formed by at least one lid sidewall and a top wall at, the top wall formed on an upper end of the at least one lid sidewall, a bottom opening formed at a bottom end of the lid body and defined by an engagement rim that surrounds the bottom opening, the engagement rim of the lid adapted to closely fit with the upper rim of the container, the lid forming a closure for the reservoir, and the lid and container forming a unitary structure upon assembly,
a second spout portion integrally formed with the lid and positioned on an outside surface of the at least one lid sidewall adjacent the lid engagement rim, the second spout portion forming a pre-measurement chamber within the at least one lid sidewall,
the first and second spout portions aligned upon assembly of the container and the lid, with the second spout portion positioned within the measurement chamber formed by the first spout portion,
the second spout portion including a spout wall having a first wall portion and an finger portion, the finger portion extending at an inward angle and having a distal edge spaced from the at least one container sidewall, the spacing between the finger portion and the at least one container sidewall defining a measurement opening for controlling the flow of material into the measurement chamber, the first spout portion being spaced from the second spout portion, the spacing between the two spout portions defining a discharge passageway between the measurement chamber and an upwardly positioned discharge outlet.

2. The measuring and dispensing device as in claim 1, wherein the distal edge of the finger portion is curved.

3. The measuring and dispensing device as in claim 2, wherein the distal edge forms a concave surface facing the upper rim of the container.

4. The measuring and dispensing device as in claim 1, wherein the distal edge of the finger portion is straight.

5. The measuring and dispensing device as in claim 1, further comprising a cover member, the cover member pivotably positioned adjacent to and movably covering the discharge passageway.

6. The measuring and dispensing device as in claim 5 wherein the cover pivot is located on the lid, adjacent the second spout portion.

7. The measuring and dispensing device as in claim 1 further comprising rib members projecting inwardly into the reservoir defined by the container and lid, the ribs causing breakup of clumps that may be formed within the flowable material.

8. The measuring and dispensing device as in claim 7 wherein the ribs are formed on an inside surface of the lid.

9. The measuring and dispensing device as in claim 8 wherein the ribs are formed on an inside surface of the bottom wall of the container.

10. The measuring and dispensing device as in claim 9 wherein the ribs form concentric circular lines.

11. A measuring and dispensing device, comprising
a container having a sidewall and a bottom wall, the container defining a storage reservoir, an opening formed at an upper end of the sidewall, and an upper rim surrounding the opening,
a first spout portion integrally formed with and projecting from an outside surface of the sidewall adjacent to the upper rim, the first spout portion forming a measurement chamber adjacent the sidewall, a lid having a lid body and a top wall formed on an upper end of the lid body, a bottom opening formed at a bottom end of the lid body, and an engagement rim surrounding the bottom opening, the engagement rim of the lid adapted to closely fit with and be retained on the upper rim of the container, the lid forming a closure for the reservoir, and the lid and container forming a unitary structure upon assembly, a second spout portion integrally formed with the lid and positioned on an outside surface of the lid body adjacent the engagement rim, the second spout portion forming a pre-measurement chamber within the lid body, the first and second spout portions aligned upon assembly, with the second spout portion positioned within the measurement chamber formed by the first spout portion, the second spout portion including a spout wall having a first wall portion and an angled finger portion, a distal edge of the finger portion spaced from the sidewall, the spacing between the finger portion and the sidewall defining a measurement opening for controlling the flow of material into the measurement chamber, the first spout portion being spaced from the second spout portion, the spacing between the two spout portions defining a discharge passageway between the measurement chamber and an upwardly positioned discharge outlet.

12. The measuring and dispensing device as in claim 11, wherein the distal edge of the finger portion forms a concave surface facing the upper rim of the container.

13. The measuring and dispensing device as in claim 11, wherein the distal edge of the finger portion is straight.

14. The measuring and dispensing device as in claim 11 further comprising rib members projecting inwardly into the reservoir, wherein the ribs are formed on an inside surface of the lid.

15. The measuring and dispensing device as in claim 14 further comprising additional ribs formed on an inside surface of the bottom wall of the container.

16. The measuring and dispensing device as in claim 14 wherein the ribs form concentric circular lines.

* * * * *